July 9, 1940.    F. MEYER ET AL    2,206,912
CURRENT RECTIFYING METHOD AND APPARATUS
Filed Jan. 17, 1928    2 Sheets-Sheet 1

INVENTORS
FRIEDRICH MEYER
HANS J. SPANNER
BY
ATTORNEY

INVENTORS
FRIEDRICH MEYER
HANS J. SPANNER
BY
ATTORNEY

Patented July 9, 1940

2,206,912

UNITED STATES PATENT OFFICE 2,206,912

CURRENT RECTIFYING METHOD AND APPARATUS

Friedrich Meyer and Hans Joachim Spanner, Berlin, Germany, assignor, by mesne assignments, to Electrons, Inc., a corporation of Delaware Application January 17, 1928, Serial No. 247,316
In Germany January 27, 1927

42 Claims. (Cl. 175—363)

This invention relates generally to the rectifying of alternating current, and more particularly to methods and apparatus for deriving auxiliary direct or pulsating current potentials from a principal current rectifying system more or less independently of the output of the principal rectifying system.

In rectifying systems having a direct or pulsating current output for supply to current consuming devices, it is frequently desirable to have available auxiliary potentials accompanied by small current consumption compared to the principal output to aid in proper control of the operation of either the rectifying system or the associated current consuming devices. For example, if the current rectifying device is a discharge tube, it may be desirable to have within such tube auxiliary electrodes for the purpose of influencing the space discharge, and to apply to these electrodes chosen polarities of potential of predetermined degree. Or if the rectifying system is employed in connection with a filter system to energize the plate circuits of one or more three electrode vacuum tubes of an amplifying system it may be desirable to have available one or more auxiliary potentials for application to the grid electrodes of the tubes, which potentials are ordinarily negative in character.

The obtaining of a positive auxiliary potential in the ordinary rectifying system is a comparatively simple matter, as will be later pointed out more in detail. The present practice however seems to require a negative auxiliary potential more often than a positive, and this invention includes a manner that is simple and not involving complicated apparatus for securing in connection with well known rectifying systems negative potentials suitable for many common purposes, even very high negative potentials.

The several features of this invention will be best understood by a discussion in connection with the figures of the accompanying drawings.

Fig. 1 shows a so-called "full wave" rectifying system in which auxiliary electrodes are included within a rectifying tube and arrangement provided for applying to these auxiliary electrodes substantially steady positive potentials.

Fig. 2 differs from Fig. 1 in that arrangement is made for applying substantially steady negative potentials to the auxiliary electrodes.

Fig. 3 differs from Fig. 1 in that arrangement is provided for securing both positive and negative auxiliary potentials for any uses that the rectifying or associated current consuming system may have for such auxiliary potentials.

Figure 1:
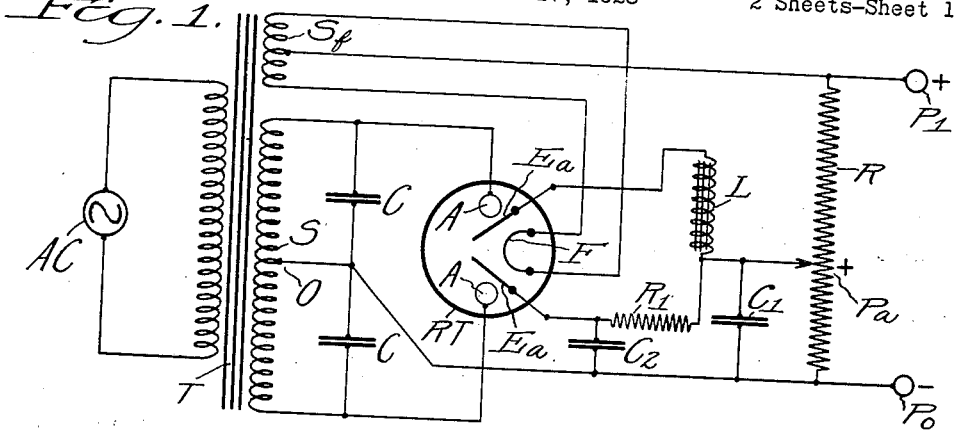

Referring to Fig 1, RT represents a rectifying discharge tube having a single filament F adapted to be heated for electron emission from a secondary winding $S_f$ of alternating current transformer T, and two anodes A for alternate, or "full wave," rectification of alternating current supplied from the two extremities of the secondary winding S of the transformer T. The transformer T is indicated as having its primary winding energized from an alternating current source AC. The secondary winding S is indicated as tapped at a substantially mid or neutral point 0, and the two portions shunted by the usual by-pass condensers C. The rectifier output circuit is shown to be included between the neutral point 0 and a neutral point on secondary winding $S_f$, terminating in positive output terminal $P_1$ and negative output terminal $P_0$, across which the usual potential dividing resistance R is connected.

The rectifier tube RT is shown to include two auxiliary electrodes $E_a$ interposed between the single filament and their corresponding anodes A. A tapped connection at a positive point $P_a$ on the resistance R provides for supplying these auxiliary electrodes with auxiliary potential positive to the anodes A. A choke coil L cooperating with filter condenser $C_1$ provides for smoothing out or steadying the potential supplied to the upper auxiliary electrode, and a resistance $R_1$ cooperating with filter condensers $C_1$ and $C_2$ provide for smoothing out a potential supplied to the lower auxiliary electrode. These filter arrangements are shown merely for illustrative purposes, it being understood that any other combination of suitable filter elements may be provided.

Thus if the rectifying tube RT is of such design and construction that it is desirable to maintain a positively charged auxiliary electrode between the filament and each of the anodes the arrangement of Fig. 1 adequately provides for taking care of this mode of desirable tube operation.

Figure 2:
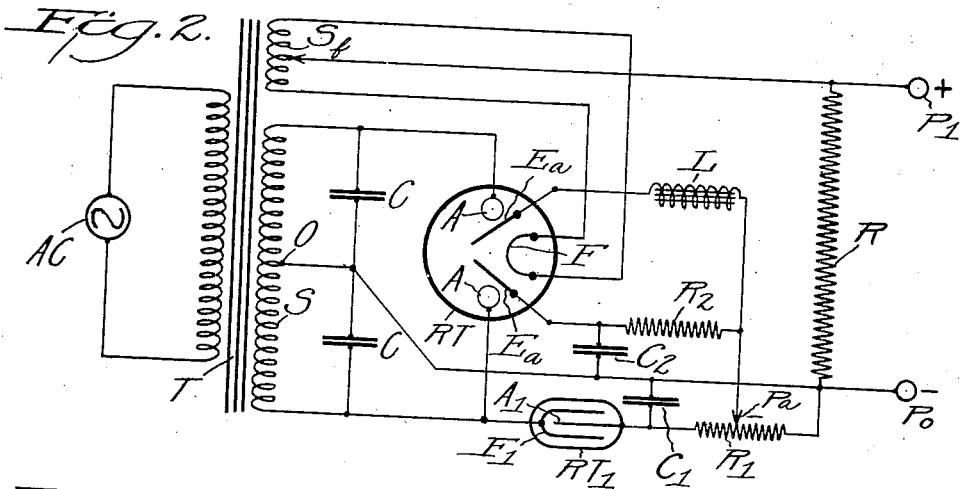

Fig. 2 is the same as Fig. 1, except that arrangement is made for subjecting the auxiliary electrodes $E_a$ to an auxiliary negative potential secured with the aid of an auxiliary rectifying tube $RT_1$, which auxiliary tube has its cathode or filament $F_1$ connected to the lower high potential end of secondary winding S, so that when this end of the transformer is negative and therefore idling with respect to the principal rectifier tube RT, it supplies rectified current to resistance $R_1$ by way of anode $A_1$. By making an auxiliary potential tap $P_a$ to resistance $R_1$ an auxiliary negative potential of any desired degree is available for application to auxiliary electrodes $E_a$, and may be smoothed out in any suitable manner, as by the filter elements choke coil L, resistance $R_2$ and condensers $C_1$ and $C_2$. It is thus seen that the auxiliary potential so derived with the aid of an auxiliary rectifying tube is wholly independent of the principal output of the rectifier.

Since the power consumption for auxiliary uses is usually quite small compared to the power of the principal output, and thus the auxiliary current is quite low, the auxiliary rectifying tube $RT_1$ may in general be a very small tube of limited capacity, and may even be a type of tube not requiring a heated cathode, somewhat of the form illustrated in which one electrode has considerably more surface area than the other with the result that the electrode with the larger surface area, because of its predominate readiness to emit more electrons, will act as the cathode, thereby producing a rectifying effect. Also, because of the small auxiliary current the filter devices may be quite simple and inexpensive. For example, if a choke coil is used it may be made up of very fine wire permitting an extremely large number of turns in a compact and inexpensive arrangement. If a resistance is used it may have small current carrying capacity, thereby permitting the use of the cheaper resistances. The filtering condensers may be kept low in cost by using very high resistances or very high inductance choke coils, thus making good filtering possible with small capacity condensers. In fact, since the auxiliary output is normally small, inefficient devices may be used without any costly expenditure of energy.

Figure 3:
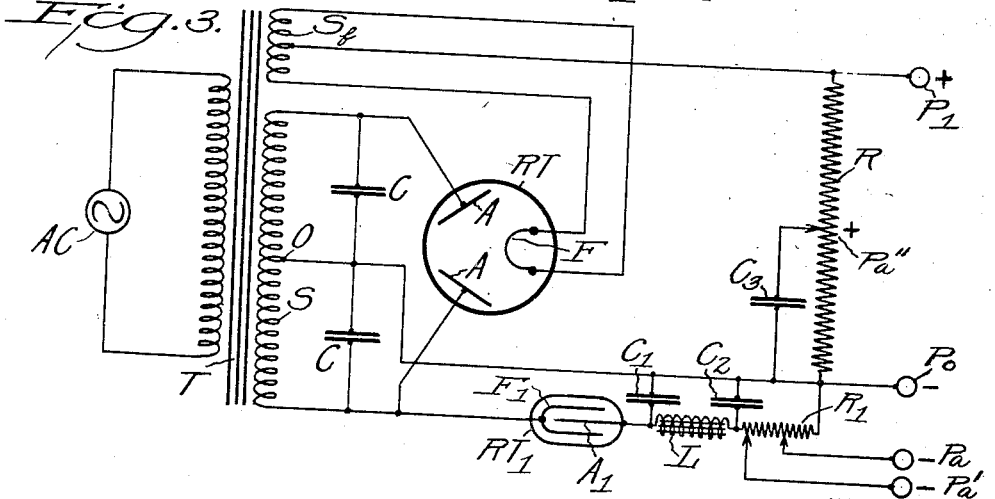

Fig. 3 differs from Fig. 2 in that no auxiliary electrodes are included in the principal rectifying tube RT, in this case the auxiliary potentials being shown delivered to terminals $P_a$ and $P_a'$ for use as may be desired as negative potentials, and a positive auxiliary potential $P_a''$ is made available by tapping on resistance R. There is also shown in the filter system a choke coil L cooperating with the filter devices resistance $R_1$ and condenser $C_1$, $C_2$ and $C_3$.

Figure 4:
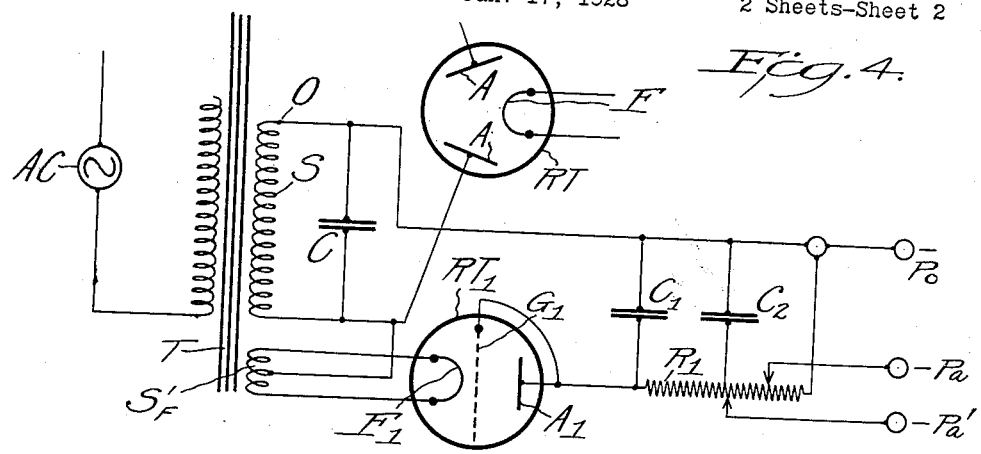
Fig. 4 is a fragmentary diagram illustrating the manner in which an auxiliary rectifying tube having a heated filament may be connected in the system to aid in securing the auxiliary potentials.

Fig. 4 is a fragment of Fig. 3 merely to point out how an auxiliary tube $RT_1$ having a heated filament may be connected in the system in such way as to derive heating current for its filament, this being provided for in the secondary winding $S_f'$ of transformer T, the substantially neutral point of this winding being connected to the lower portion of secondary winding S. The auxiliary rectifying tube $RT_1$ is illustrated as an ordinary three electrode vacuum tube in which the grid $G_1$ is directly connected outside of the tube to the plate $A_1$.

Figure 5:
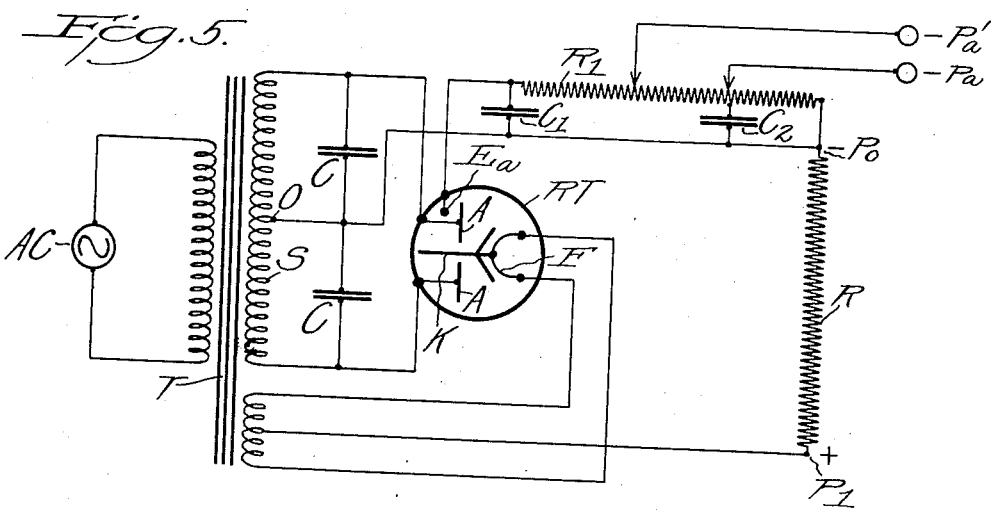
Fig. 5 illustrates an arrangement in which an auxiliary anode is included in a discharge tube to aid in securing a source of auxiliary potentials.

Fig. 5 shows an arrangement in which an auxiliary electrode $E_a$ is included in the principal rectifying tube RT to cooperate with one of the anodes A, which acts as a cathode in such cooperation, to form an auxiliary rectifying system for aiding in the production of the auxiliary potentials. By constructing the auxiliary electrode $E_a$ small compared to the anode A, the correct sense of rectification is assured, the rectified current passing through resistance $R_1$ by way of points $P_0$ and 0 to the anode A, when this anode is acting as a cathode on that half of the alternating current cycle during which it is not functioning as an anode in the principal rectifier. The desired auxiliary potentials may be tapped from resistance $R_1$ to the terminals $P_a$ and $P_a'$ as shown.

The shield K in the rectifying tube RT, located as shown between the two anodes A, assures that there will be no discharge between the two anodes to interfere with the normal operation of this tube as a "full wave" rectifier, which action might be assisted in the absence of such shield by the discharge action expected between the upper anode A and the auxiliary electrode $E_a$.

Figure 6:
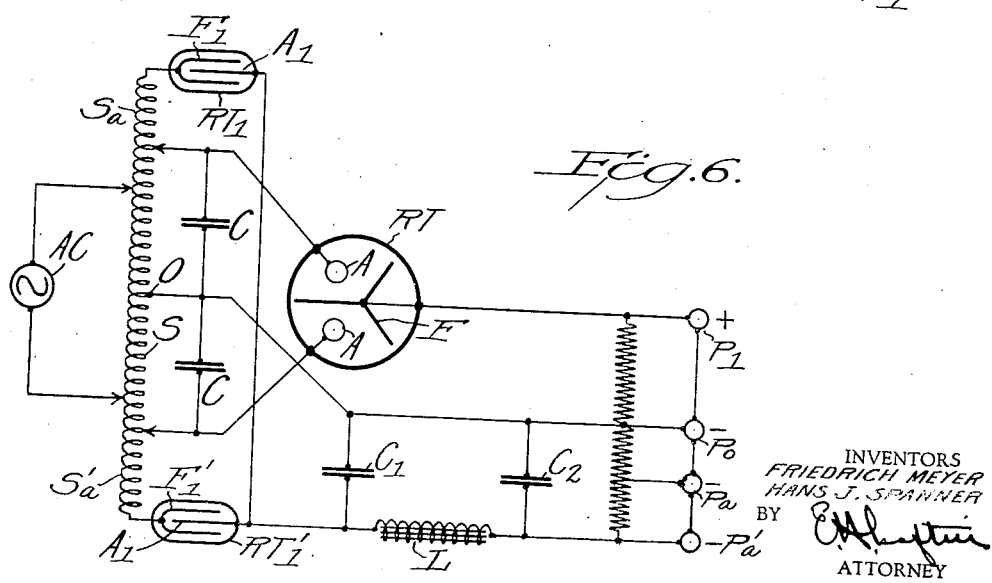
Fig. 6 illustrates an arrangement in which two auxiliary rectifying tubes are associated with the principal rectifying system to aid in securing a source of auxiliary potentials.

Fig. 6 shows an arrangement in which an auto transformer, or reactance coil S, is used in lieu of a two winding transformer. It is of course understood that a resistance may be substituted for the reactance coil. The desired potential distributions will be obtained by proper and well known forms of connections on the alternating current input from the source AC to the reactance or resistance, and proper connections of the rectifying tube RT, all as clearly illustrated in the figure. The figure also includes a showing of an arrangement in which increased auxiliary potentials may be secured, as by extending the reactance coil S to include the portions $S_a$ and $S_a'$, and connecting the auxiliary rectifiers $RT_1$ and $RT_1'$ to these extensions, it of course being understood that a so-called "double wave" rectifier may be substituted for the two independent rectifiers shown where "double wave" rectification for the auxiliary potential is desired. The filtering and other features of the system are substantially as previously described in connection with the other figures.

While the systems are illustrated in connection with single phase alternating current, the application of them to multiple phase alternating current systems will be readily apparent to those skilled in the art.

It will be noted that in securing negative auxiliary potential, it is necessary to so connect the auxiliary rectifying tube that the direction of rectified current flow is from the highest potential end of the coil S through the tube to the neutral point 0.

Having fully described our invention, we claim:
1. In a system for rectifying alternating current having an output of pulsating direct current and including a source of alternating current and a discharge tube rectifier having discharge electrodes and an auxiliary discharge influencing electrode, the method of operating said system which includes rectifying said alternating current in said discharge tube, independently rectifying current from said source, passing said independently rectified current through a current consuming device, and extracting for and impressing upon said auxiliary electrode a desired degree of potential from the differences of potential available in said current consuming device.

2. In an alternating current rectifying system having an output of pulsating direct current and including a source of alternating current and a discharge tube rectifier having discharge electrodes and an auxiliary discharge influencing electrode, means for securing an energizing direct current potential for said auxiliary electrode from said alternating current source including means for independently rectifying alternating current from said source to obtain a biasing potential, and means for impressing said biasing potential upon said auxiliary discharge electrode to control the operation of the tube.

3. In an alternating current rectifying system having an output of pulsating direct current and including a source of alternating current and a discharge tube rectifier having discharge electrodes and an auxiliary discharge influencing electrode, means for applying a direct current potential derived from said alternating current source to said auxiliary electrode including means for independently rectifying current from said source, a current consuming device through which said independently rectified current is passed, and a connection between said auxiliary electrode and a potential point in said current consuming device.

4. An alternating current rectifier comprising a rectifying tube having main discharge electrodes and a grid for controlling the discharge between said electrodes, and means for applying a substantially constant potential to said grid comprising a potential divider connected across the output terminals of the rectifier, a connection between a point on the divider and the grid, and filter means in said connection.

5. An alternating current rectifier comprising a rectifying tube having main discharge electrodes arranged for full wave rectification and grids for controlling the discharge between said electrodes, means for applying a direct current potential to the grids comprising a potential divider connected across the output of the rectifier with connections between a point on the divider and the grids to impress a suitable bias thereon, and filter means in said connections for smoothing out the biasing potential.

6. In an alternating current rectifying system including a rectifying discharge tube having a principal anode and a principal cathode, an auxiliary electrode associated with said principal anode, means for energizing said principal electrodes to rectify a principal current, connections whereby said principal anode and auxiliary electrode function to rectify an auxiliary current during periods of inactivity of said principal anode in the principal rectifying function, a load circuit traversed only by the principal rectified current and a load circuit traversed only by the auxiliary rectified current, the said circuits being connected in series.

7. In an alternating current rectifier system having a coil adapted to be energized from an alternating current source and tapped at its approximate center thereby providing a point of neutral potential in said system, a principal rectifier and an auxiliary rectifier, the method of operating said system which comprises the steps of rectifying the positive half-cycles of potential in both portions of said coil by said principal rectifier, rectifying the negative half-cycles of potential in at least one portion of said coil by said auxiliary rectifier, and using a potential obtained from said auxiliary rectifier to control the operation of said principal rectifier.

8. The combination of an alternating current rectifying tube having main discharge electrodes arranged for full wave rectification and auxiliary electrodes for influencing the discharge of the main electrodes, a source of alternating current supply for said main electrodes, said source comprising a winding, and means energized by said winding for supplying to each of the discharge influencing electrodes a substantially constant biasing potential which is negative to the negative pole of the rectified potential obtained from the main discharge electrodes.

9. In an alternating current rectifying system, the combination of a rectifying discharge tube containing a pair of anodes, a cathode, and an auxiliary electrode associated with one only of said anodes, means for energizing said anodes to rectify opposite half-cycles of single-phase alternating current, said means providing a point of neutral potential in the system, connections to said cathode including a resistance for obtaining a positive rectified potential with respect to the neutral point, and connections for obtaining from said auxiliary electrode and the anode associated therewith a negative rectified potential with respect to the said neutral point, the latter connections including a continuation of the said resistance.

10. Means for maintaining a constant voltage comprising a varying alternating voltage source, a three-element vacuum tube, means to impress the source upon the plate of the three-element tube, a two-element thermionic valve, means for impressing the voltage source across the valve, and means to impress the rectified voltage of the valve on the grid of the three-element vacuum tube to provide the latter with a negative bias with respect to the filament.

11. Means for maintaining a constant voltage comprising a varying alternating voltage source, a three-element vacuum tube, means to impress the source upon the plate of the three-element tube, a two-element thermionic valve, means for impressing the voltage source across the valve, means to impress the rectified voltage of the valve on the grid of the three-element vacuum tube to provide the latter with a negative bias with respect to the filament, and means to vary the voltage impressed on the grid.

12. Means for maintaining a constant voltage comprising a varying alternating voltage source, a three-element vacuum tube, means to transform the current from the source, means to impress a portion of the transformed current upon the plate of the three-element tube, a two-element thermionic valve, means to impress another portion of the transformed current source across the valve, and means to impress the rectified voltage of the valve on the grid of the three-element vacuum tube to provide the latter with a negative bias with respect to the filament.

13. The method of regulating the flow of current through an electronic tube subjected to an alternating potential and having a controlling electrode which consists in periodically storing the energy of a unidirectional current, effecting and regulating discharge of such energy to produce a voltage and subjecting said controlling electrode to such voltage.

14. The method of regulating the flow of current through an electronic tube subjected to an alternating potential and having a controlling electrode which consists in storing energy in a circuit during alternate half cycles of such alternating potential, effecting and regulating discharge of such stored energy during the other half cycles to produce a voltage and subjecting said controlling electrode to the influence of such voltage.

15. In combination, a current supply, a circuit to be supplied thereby, an electron tube for continuously regulating the effective current of said circuit and having a control electrode, an asymmetrically conducting energy storage circuit, and means to impress a voltage upon said storage circuit and to subject said control electrode to a regulable voltage resulting from the discharge of said storage circuit.

16. In combination, a current supply, a circuit to be supplied thereby, an electron tube for continuously regulating the effective current of said circuit and having a control electrode, an energy storage circuit containing a rectifier, and means to impress a voltage upon said energy storage circuit and to subject said control electrode to a regulable voltage resulting from the discharge of said storage circuit.

17. In combination, an alternating current supply, a circuit to be supplied thereby, an electron tube for regulating the effective current of said circuit and having a control electrode, an asymmetrically conducting energy storage circuit, and means to impress a voltage derived from said supply upon said storage circuit and to subject said control electrode to a regulable voltage resulting from the discharge of said storage circuit during alternate half cycles.

18. In combination, an alternating current supply, a circuit to be supplied thereby, an electron tube for regulating the effective current of said circuit and having a control electrode, an energy storage circuit containing a rectifier, and means to impress a voltage derived from said supply upon said storage circuit and to subject said control electrode to a regulable voltage resulting from the discharge of said storage circuit during alternate half cycles.

19. In combination, an alternating current supply, a circuit supplied thereby, an electron tube continuously regulating the effective current of said circuit and having a control electrode, and a regulable asymmetrically conducting energy storage circuit connected to said supply and to said control electrode.

20. In combination, an alternating current supply, a circuit to be supplied thereby, an electron tube continuously regulating the effective current of said circuit and having a control electrode, a regulable asymmetrically conducting energy storage circuit connected to said control electrode and means to supply a charging current to said storage circuit during alternate half cycles of the alternating current.

21. In combination, an alternating current supply, a circuit to be supplied thereby, an electron tube regulating the effective current of said circuit and having a control electrode, an asymmetrically conducting energy storage circuit and means to supply a charging current to said storage circuit during alternate half cycles of the alternating current and to impress a discharge voltage of said storage circuit upon said control electrode during the other half cycles.

22. In combination, an alternating current supply, a circuit to be supplied thereby, an electron tube regulating the effective current of said circuit and having a control electrode, an asymmetrically conducting energy storage circuit connected to said supply to receive a charging current therefrom during alternate half cycles of the supply voltage and a connection between said storage circuit and said control electrode whereby a discharge voltage of the former is impressed upon the latter during the other half cycles.

23. In combination, an alternating current supply, a circuit to be supplied thereby, an electron tube for regulating the effective current of said circuit and having a control electrode, an energy storage circuit containing a rectifier, a connection between said supply and said storage circuit to impress upon the latter a potential which is a function of the voltage of the former, and connections whereby a discharge voltage of said storage circuit is impressed upon said control electrode during alternate half cycles.

24. In combination, an alternating current supply, a circuit to be supplied thereby, an electron tube for controlling the effective current of said circuit and having a control electrode, a condenser and a parallel impedance connected between one terminal of said supply and said control electrode, a rectifier connected to said control electrode, and means to impress upon said condenser a potential which is a function of the supply voltage and to impress upon said control electrode during alternate half cycles a discharge voltage of said condenser.

25. In combination, a current supply, a circuit to be supplied thereby, an electron tube for continuously regulating the effective current of said circuit and having a control electrode, an asymmetrically conducting energy storage circuit, and adjustable means to impress a voltage upon said storage circuit and to subject said control electrode to a regulable voltage resulting from the discharge of said storage circuit.

26. In combination, an alternating current supply, a circuit to be supplied thereby, an electron tube for controlling the effective current of said circuit and having a control electrode, an energy storage circuit containing a rectifier, an adjustable connection between said supply and said storage circuit to impress upon the latter a potential which is a function of the voltage of the former and connections whereby a discharge voltage of said storage circuit is impressed upon said control electrode during alternating half cycles.

27. In combination, an alternating current supply, a circuit to be supplied thereby, an electron tube for controlling the effective current of said circuit and having a control electrode, a condenser and a parallel impedance connected between one terminal of said supply and said control electrode, a rectifier connected to said control electrode, and adjustable means to impress upon said condenser a potential which is a function of the supply voltage and to impress upon said control electrode during alternating half cycles a discharge voltage of said condenser.

28. In combination, a current supply, a circuit to be supplied thereby, an electron tube for continuously regulating the effective current of said circuit and having a control electrode, an asymmetrically conducting energy storage circuit, and means to impress a voltage upon said storage circuit and to subject said control electrode to a regulable voltage resulting from the discharge of said storage circuit.

29. In combination, a current supply, a circuit to be supplied thereby, an electron tube for continuously regulating the effective current of said circuit and having a control electrode, an energy storage circuit containing a rectifier, and means to impress a voltage upon said energy storage circuit and to subject said control electrode to a regulable voltage resulting from the discharge of said storage circuit.

30. In combination, an alternating current supply, a circuit to be supplied thereby, an electron tube for regulating the effective current of said circuit and having a control electrode, an asymmetrically conducting energy storage circuit, and means to impress a voltage derived from said supply upon said storage circuit and to subject said control electrode to a regulable voltage resulting from the discharge of said storage circuit during alternate half cycles.

31. In combination, an alternating current supply, a circuit to be supplied thereby, an electron tube for regulating the effective current of said circuit and having a control electrode, an energy storage circuit containing a rectifier, and means to impress a voltage derived from said supply upon said storage circuit and to subject said control electrode to a regulable voltage resulting from the discharge of said storage circuit during alternate half cycles.

32. In combination, an alternating current supply, a circuit to be supplied thereby, an electron tube regulating the effective current of said circuit and having a control electrode, an asymmetrically conducting energy storage circuit and means to supply a charging current to said storage circuit during alternate half cycles of the alternating current and to impress a regulable discharge voltage of said storage circuit upon said control electrode during the other half cycles.

33. In combination, an alternating current supply, a circuit to be supplied thereby, an electron tube regulating the effective current of said circuit and having a control electrode, an asymmetrically conducting energy storage circuit connected to said supply to receive a charging current therefrom during alternate half cycles of the supply voltage and a connection between said storage circuit and said control electrode whereby a regulable discharge voltage of the former is impressed upon the latter during the other half cycles.

34. In combination, an alternating current supply, a circuit to be supplied thereby, an electron tube for regulating the effective current of said circuit and having a control electrode, an energy storage circuit containing a rectifier, a connection between said supply and said storage circuit to impress upon the latter a potential which is a function of the voltage of the former, and connections whereby a regulable discharge voltage of said storage circuit is impressed upon said control electrode during alternate half cycles.

35. In combination, a current supply, a circuit to be supplied thereby, an electron tube for continuously regulating the effective current of said circuit and having a control electrode, an asymmetrically conducting energy storage circuit, and adjustable means to impress a voltage upon said storage circuit and to subject said control electrode to a regulable voltage resulting from the discharge of said storage circuit.

36. In combination, an alternating current supply, a circuit to be supplied thereby, an electron tube for controlling the effective current of said circuit and having a control electrode, an energy storage circuit containing a rectifier, an adjustable connection between said supply and said storage circuit to impress upon the latter a potential which is a function of the voltage of the former, and connections whereby a discharge voltage of said storage circuit is impressed upon said control electrode during alternating half cycles.

37. In combination, an alternating current supply, a circuit to be supplied thereby, an electron tube for controlling the effective current of said circuit and having a control electrode, a condenser and a parallel impedance connected between one terminal of said supply and said control electrode, a rectifier connected to said control electrode, and adjustable means to impress upon said condenser a potential which is a function of the supply voltage and to impress upon said control electrode during alternating half cycles a discharge voltage of said condenser.

38. In an electrical alternating current rectifying system, the combination of a source of alternating current, means for creating from said source a principal rectified current and an auxiliary rectified current comprising a rectifying discharge tube having an anode and a cathode, means for energizing said anode and cathode to rectify an electrical alternating current, a second rectifying device, and connections whereby said second device functions independently to rectify alternating current from said source during periods of inactivity of said anode, and a load impedance through which a voltage of said principal rectified current is developed.

39. In an electrical alternating current rectifying system, the combination of a source of alternating current, means for creating from said source a principal rectified current and an auxiliary rectified current comprising a rectifying discharge tube having a cathode and two anodes, means for energizing said cathode and anodes to alternately rectify an electrical alternating current, a second rectifying device, and connections whereby said second device functions independently to rectify alternating current from said source during periods of inactivity of one of said anodes without impairing the simultaneous activity of the other one of said anodes, and a load impedance through which a voltage of said principal rectified current is developed.

40. In an electrical alternating current rectifying system, the combination of a source of alternating current, means for creating from said source a principal rectified current and an auxiliary rectified current comprising a rectifying discharge tube having a cathode and two anodes, means for energizing said cathode and anodes to alternately rectify an electrical alternating current, two auxiliary rectifying devices, and connections whereby said auxiliary rectifying devices alternately function independently to rectify said alternating current from said source during periods of inactivity of said anodes without impairing the alternate simultaneous activity of either one of said anodes, and a load impedance through which a voltage of said principal rectified current is developed.

41. In an alternating current rectifying system having an output of pulsating direct current and including a source of alternating current and a discharge tube rectifier having discharge electrodes and an auxiliary discharge influencing electrode, an asymmetrical conducting energy storage circuit in which alternating current is independently rectified from said source to obtain a biasing potential, and a connection from said storage circuit to said auxiliary electrode for impressing said biasing potential upon said auxiliary discharge electrode to control the operation of the tube.

42. In an alternating current rectifying system having an output of pulsating direct current and including a source of alternating current and a discharge rectifier having discharge electrodes and an auxiliary discharge influencing electrode, an asymmetrical conducting energy storage circuit in which alternating current is independently rectified from said source, a resistance through which said independently rectified current is passed, and a connection between said auxiliary electrode and a potential point on said resistance for applying a direct current potential derived from said alternating current source to said auxiliary electrode.

FRIEDRICH MEYER.
HANS JOACHIM SPANNER.